United States Patent [19]

Vivarelli

[11] Patent Number: 5,812,287
[45] Date of Patent: Sep. 22, 1998

[54] HOLOGRAMS HAVING A STANDARD REFERENCE COLOR

[75] Inventor: Ulisse Vivarelli, Scandicci, Italy

[73] Assignee: Istituto Poligrafico e Zecca Dello Stato, Rome, Italy

[21] Appl. No.: 351,287

[22] PCT Filed: Jun. 8, 1993

[86] PCT No.: PCT/EP93/01437

§ 371 Date: Dec. 8, 1994

§ 102(e) Date: Dec. 8, 1994

[87] PCT Pub. No.: WO93/25941

PCT Pub. Date: Dec. 23, 1993

[30] Foreign Application Priority Data

Jun. 8, 1992 [IT] Italy ................................. FI92 A 0122

[51] Int. Cl.$^6$ ............................. G03H 1/00; G02B 5/32
[52] U.S. Cl. ................................ 359/2; 359/15; 359/32; 283/86
[58] Field of Search .................... 359/2, 10, 22, 359/24, 28, 32, 34, 1, 15; 356/347, 402, 403, 407, 408; 283/85, 86

[56] References Cited

U.S. PATENT DOCUMENTS

| 1,354,471 | 10/1920 | Doner . |
| 3,578,845 | 5/1971 | Brooks . |
| 3,633,989 | 1/1972 | Benton . |
| 4,629,282 | 12/1986 | McGrew . |
| 4,913,504 | 4/1990 | Gallagher . |
| 4,998,785 | 3/1991 | Ridout . |
| 5,153,751 | 10/1992 | Ishikawa et al. ............................ 359/13 |

FOREIGN PATENT DOCUMENTS

| 0247471 | 12/1987 | European Pat. Off. . |
| 0251815 | 1/1988 | European Pat. Off. . |
| 82 01595 | 5/1982 | WIPO . |

OTHER PUBLICATIONS

Optics and Laser Technology, vol. 23, No. 6, Dec. 1991, Haywards Heath, GB, pp. 341–344, E.H. Hogert et al., Alignment and/or Tilting Measurement by Means of Conical Diffraction Phenomena.
Bartolini et al., Embossed Hologram Motion Pictures For Television Playback, Oct. 1970, Applied Optics, vol. 9, No. 10, pp. 2283–2290.
M.C. Hutley, National Physical Laboratory, 1979, pp. 6–7.
N.G. Vlasov et al., Production of Color Specimens by Rainbow Holography, Opt. Spectrosc. (USSR) 67(2), Aug. 1989, pp. 243–245.

*Primary Examiner*—Paul M. Dzierzynski
*Assistant Examiner*—Darren E. Schuberg
*Attorney, Agent, or Firm*—Kenyon & Kenyon

[57] ABSTRACT

Holograms and diffraction gratings are described wherein the presence of a "key-colour" (Magenta) permits an observer to identify the position where all the other colours of the hologram in question can be univocally determined. Two set of spectra are provided such that at a predetermined angle a reference beam of incident white-light illuminating the hologram or diffraction grating composition will cause the observer to see the color "Magenta" which is to be used as a reference "key-colour".

32 Claims, 2 Drawing Sheets

HOLOGRAMS HAVING A STANDARD REFERENCE COLOR

BACKGROUND OF THE INVENTION

1. Field of the Invention

The present invention relates generally to the field of light diffracting patterns, such as diffraction gratings and surface-relief holograms. The invention is specifically directed, although not restricted to, rainbow holograms and diffraction gratings used to form decorative or graphic compositions, wherein an image is formed of two or more colours by means of contrasting areas of diffracted light. The invention is directed to a method of using holographically generated diffraction patterns or holograms with multiple spectral colours wherein a "key-colour" (Magenta) is provided which permits the identification of the correct viewing position from which an observer must examine the image in order to see all the other colours in they correct hues.

2. Description of Related Art

Use of diffraction gratings to compose patterns and multi-coloured designs without the use of any conventional inks or pigments has been described, for example U.S. Pat. No. 1,354,471 wherein jewellry, signs and other articles are decorated by colours derived by the diffraction of incident white-light into iridescent spectral colours. Light diffracting patterns such as those described in the above said US Patent are formed by mechanically ruling fine parallel lines into a suitable substrate, the different combinations of shades and colours being attained by varying the number and direction of the lines. A method of making diffraction gratings by optical means is described in the U.S. Pat. No. 3,578,845 using two beams of coherent light from a laser to form a holographic diffraction grating.

The use of holographically formed diffraction gratings to produce decorative patterns which may be embossed into plastic is described by M. C. Hutley in the Spring 1979 issue of the National Physical Laboratory Newsletter pages 6–7. By this method a plurality of complimentary photographic masks are used to form several surface-relief gratings in a photo-resist, to produce the desired decorative pattern. A more elaborate method is described in U.S. Pat. No. 4,629,282 wherein a rainbow hologram (as disclosed in U.S. Pat. No. 3,633,989) is made of a diffusing surface (such as a piece of ground glass) to produce diffractive colour effects. A variation of this method is described in U.S. Pat. No. 4,998,785 wherein the slit laser transmission hologram is replaced by a lens array. In both these methods a diffraction grating is formed in a photo-resist by means of the mutual interference of two or more coherent monochromatic beams of light from a laser to provide a surface relief pattern for subsequent embossing into plastic or other embossable materials. The process of replicating surface-relief holograms formed in photo-resist to form nickel stamping dies which are subsequently used to emboss holograms into plastic materials has been described in detail by a number of authors (see for example Bartolini et al. Applied Optics Vol. 9–10 October 1970, pages 2283–2290. These methods have been improved upon to provide embossed holograms and diffraction gratings for decorative and security purposes, for example U.S. Pat. No. 4,913,504 describes a process for embossing holograms to form a security device for marking documents or articles of value.

Embossed holograms and diffraction gratings provide a high degree of security relative to conventional printed markings or designs, because the diffractive rainbow colours of embossed holograms and diffraction gratings can not be reproduced by conventional printing techniques or by photocopying or photographic methods.

Rainbow holograms and diffraction grating compositions provide an inexpensive means of guaranteeing the authenticity of a document or marking a product as being genuine, rather than counterfeit goods.

Because of their utility as a security device for documents and product marking, the use of embossed holograms has increased worldwide, whilst the general public have little comprehension of holograms and are unused to discerning multi-colour hologram images or diffractive compositions.

One of the main problems for uninitiated observers of multi-colour rainbow holograms and diffraction grating compositions is that the diffractive colours do not remain constant but change hue depending on the angle of observation or illumination. Observers who are familiar with pigment colours have no problem distinguishing a "red" from a "green" when colours are formed with conventional inks or pigments, but they will often experience difficulty in distinguishing one diffractive colour from another, because all the colours pass through the full spectrum as the head of the observer or the hologram is moved or the angle of illumination is altered.

As the proliferation of embossed multi-colour holograms and diffraction grating designs becomes greater, so there is an increased need for an observer to be able to identify the correct viewing position from which to observe the hologram. The object of the present invention is to provide a means wherein the kinetic diffractive colours in a multi-colour rainbow hologram or diffraction grating composition can be unequivocally defined.

SUMMARY OF THE INVENTION

The present invention overcomes the above said problems making it possible to recognize immediately and unambiguously the correct position to view the hologram or diffractive composition therefore making it possible for the observer to read the colours or the information which must ensure the originality of the examined hologram.

The operator, who obviously knows what is the exact disposition of the colours or other informations corresponding to the wanted image, should simply put the hologram in a position which affords the appearence of a key-colour, which can be a part of the general design or may form a separate portion of the image alongside the design, and verify whether the other colours or informations correspond to the wanted plot.

It is evident that the possibility to reproduce or falsify such hologram is greatly disminished offering a more effective security device for guaranteeing the authenticity of documents and for indicating the genuine nature of commercial products and goods on which the hologram or the diffractive composition are applied.

For realising this method of identification of the genuinity of documents and goods according to the invention the image in the hologram or diffractive composition will contain a plurality of diffractive colours with at least one portion of the image diplaying a key-colour (Magenta) obtained by two overlapping zones of spectral dispersion such that the position where the two zones combine is at the extreme end of the visible spectrum of one zone just prior to the infra-red and the extreme end of the visible spectrum on the other zone just prior to the ultra violet.

This two overlapping zones are produced by sequential double exposure from of an object beam and reference beam wherein the reference beam is moved by a predetermined angle of displacement between two exposure.

The invention will be better comprised with the help of the reported Figures.

DESCRIPTION OF THE PREFERRED EMBODIMENTS

Figure 1:
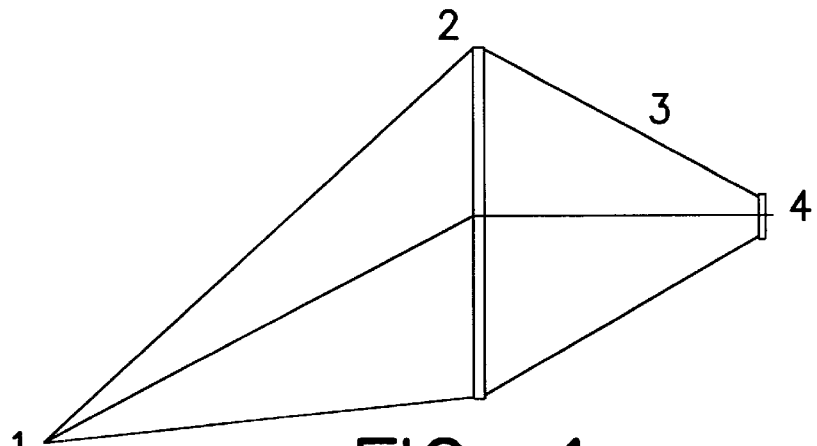
FIG. 1 shows the arrangement for making an hologram (or diffraction grating) according to the prior art.

As it can be seen in FIG. 1 a beam of coherent monochromatic light 1 from a laser illuminates a photosensitive plate 2 and interferes with a second beam 3 which may be called the "object" beam, emanating from a laser transmission hologram 4, which may also be a beam emanating from a diffusion screen or lens array, or some other means of directing the object beam to the plate to form the desired type of hologram or diffraction grating. The details of exposure and subsequent processing of the plate are described in the art.

Figure 2:
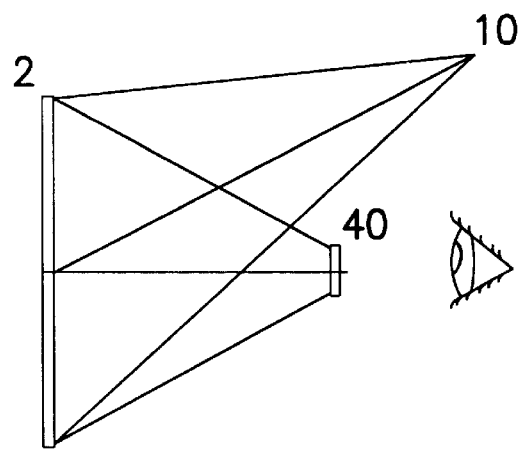
FIG. 2 shows the illumination of a rainbow hologram (or diffraction grating) in white-light according to the prior art.

When the hologram is illuminated in white light (see FIG. 2) the beam 10 from the sun or domestic light source illuminates the plate 2 to provide a real image of the laser transmission hologram 4 as a dispersed spectrum 40, wherein every wave length in the white-light separately provides the real-image of the laser transmission hologram.

Figure 3:
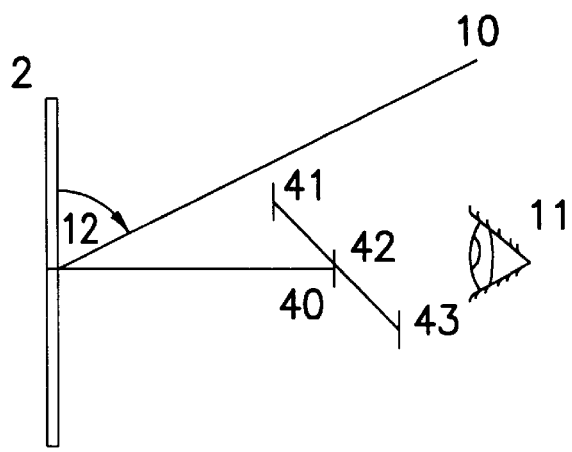
FIG. 3 shows the dispersion of the spectral colours in a rainbow hologram (or diffractive grating).

FIG. 3 shows the spectral dispersion hologram or diffraction grating as seen by the observer. The hologram plate 2 illuminated by beam of white light 10, shown unspread for clarity, at angle 12 which provides a spectral dispersion 40, wherein the colour seen by an observer 11 at a position 41 is red at the far end of the visible spectrum green at a position 42, mid point of the spectral dispersion, and blue at position 43 at the other end of the visible spectrum.

If plate 2 is tilted to position 20 or 21 (see FIG. 4), or the illumination beam 10 is moved to position 101 or 102 then the colour seen by an observer 11 at position 40 will alter. Similarly the colour seen by an observer 11 will alter if the hologram plate 2 is shifted vertically up to position 31 or down to position 32. Likewise the colour seen by an observer 11 will alter if the observer moves vertically upward to position 33 or downward to position 34.

Figure 4:
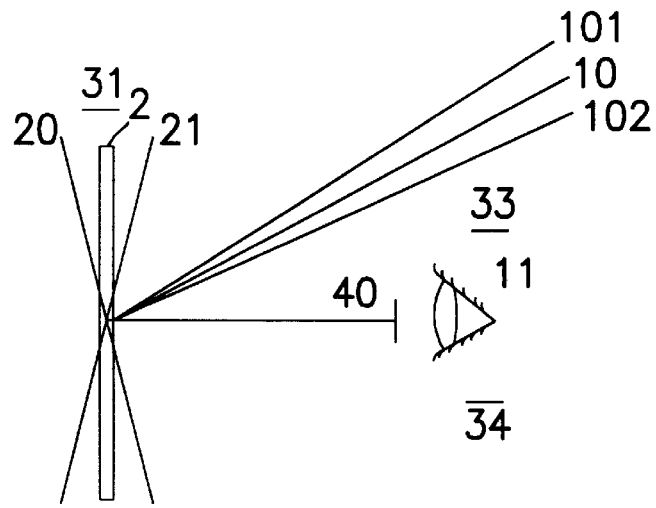
FIG. 4 shows the displacements of the rainbow hologram (or diffraction grating) or of the illumination source which give rise to a colour shift.
Figure 5:
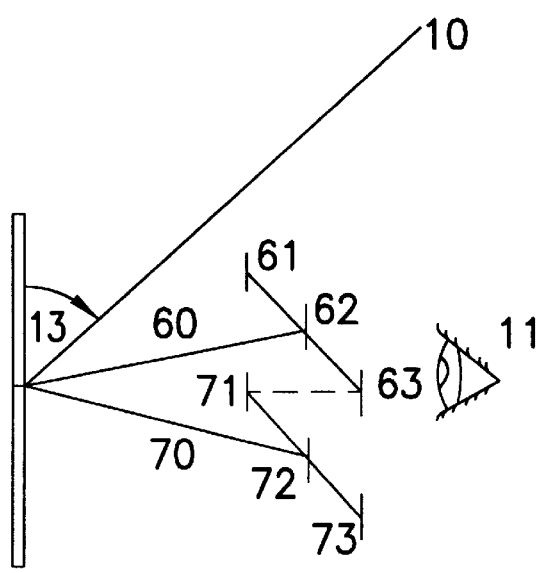
FIG. 5 shows the Magenta "key-colour" according to the present invention, formed as said by the combination of two spectra arranged so that their positions overlap very briefly only at one position and any slight alteration either of the angle of the rainbow hologram (or diffractive grating) or of the illumination source causes one or other of the spectra to be displaced into the invisible region of the spectrum either in the infra-red or ultra-violet.

FIG. 5 shows the configuration employed by the present invention wherein two sets of spectra, 60 and 70 are provided, such that at a predetermined angle 13, a reference beam of incident white-light 10, illuminating the hologram or diffraction grating composition, will cause an observer 11 to see the colour Magenta which is to be used as a reference "key-colour". The colour Magenta is obtained by combining the far Blue end 63 of the first spectra dispersion 60 with the far red end of the second spectral dispersion 73. Any slight motion of the observer, or displacement of the plate (as illustrated in FIG. 4) will cause the "key-colour" Magenta to vanish as either spectral dispersion 60 will disappear beyond point 63 into the ultra violet part of the spectrum or spectral dispersion 70 will disappear beyond point 71 into the infra-red part of the spectrum.

The two over-lapping spectral dispersion zones which together comprise the Magenta "key-colour" diffraction zone may be made by sequential double exposure by an object beam and reference beam wherein the reference beam is moved by a predetermined angle of displacement between the two exposures. The exact angles with respect to the plate of the two reference beam positions required to make the Magenta "key-colour" diffraction zone are dependent upon the wavelength of the laser used and the desired optimum viewing angle.

According to another method the two overlapping zones can be produced by sequential double exposure of a reference beam in conjunction with an object beam which is displaced by a predetermined amount between the two consecutive exposures. The vertical displacement of the object beam derived from a laser transmission hologram slit or diffuser or lens array is likewise dependent upon the wavelength of the laser and the desired viewing parameters required for the hologram or diffractive composition.

The Magenta "key-colour" may be used in conjunction with any other diffractive colours, which may be made of single or multiple exposures made in the usual way according to the prior art. On completion of the multi-colour rainbow hologram or diffraction grating composition the Magenta "key-colour" is used as the reference point to establish unequivocally the exact position for the examination and definition of the colours in the image, because it is visible only for a brief moment, prior to the collapse of one or other of the two spectral dispersion zones of which it is comprised. If the other colours in the hologram or diffraction grating are made using arbitrary angles or random mixtures of double or triple exposures of different values of luminosity, the resulting hologram will have colour values which are unique and very difficult to reproduce exactly. A complex mixture of colours would normally be very difficult to recognise but by using the Magenta "key-colour" as a reference point to establish the exact position at which the colours are to be examined, very subtle mixture of diffractive colours can be identified and checked by an observer.

As well as using the Magenta "key-colour" as a reference means to establish the correct position for reading colours which have been arbitrarily generated, the Magenta "key-colour" may also be used as a means to establish the correct viewing position for a hologram or diffraction composition contrived to show an image in full natural colours. In this instance the two diffraction zones which together make up the Magenta "key-colour" diffraction zone are aligned to a third zone of spectral dispersion so that collectively they add to a neutral diffraction zone composed of the same colour value as the white-light used for illumination.

Figure 6:
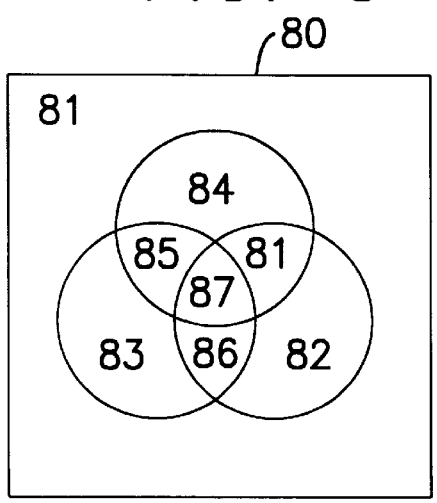
FIG. 6 shows a full-colour rainbow hologram or diffracting grating composition, wherein the Magenta is used to define the correct viewing angle for an observer to view the image and see it in natural colour.

FIG. 6 shows a full-colour rainbow hologram or diffraction grating composition wherein Magenta has been used as a "key-color" to define correct viewing angle for an observer to view the image and see the natural colour. On the plate 80 are areas of diffracted colour, where region 81 is Magenta, whilst region 82, 83 and 84 are other regions of diffractive colour such that when region 81 appears Magenta region 82 appears a primary red, region 83 appears a primary green and region 84 appears a primary blue. If the relative angles of diffraction of zones of regions 82, 83 and 84 are correct then region 85 will appear as a light blue or cyan colour and region 86 will appear yellow. Confirmation that diffraction zones from regions 82, 83 and 84 are correct may be derived from region 87 where the diffraction zones should add to a perfect neutral white.

In the preferred method the Magenta "key-colour" would be used as a dominant component of the image, however, the Magenta "key-color" can also be used in the multi-colour rainbow hologram or diffractive composition as part of the general design or the Magenta "key-colour" may form a separate portion or the image alogside the design such as a part of a chromatic-diagram serving only as a reference for the observer to establish with absolute unambiguity the correct viewing position of the hologram or diffractive composition.

I claim:

1. A process for identifying a playback position of a diffracting composition, comprising providing a diffracting composition comprising a predetermined image and a reference colour produced by overlapping a first and second zone of spectral dispersion wherein the predetermined image is visible when the reference colour is visible; and viewing the diffracting composition from a position at which the reference colour is visible.

2. The process according to claim 1, wherein the first and second zones of spectral dispersion overlap at an extreme end just prior to the infra-red of the visible spectrum of the first zone and an extreme end just prior to the ultra-violet of the visible spectrum of the second zone.

3. The process according to claim 1 wherein the first and second zones of spectral dispersion are produced by consecutive exposures by a reference beam in conjunction with an object beam which is displaced by a predetermined amount between the two consecutive exposures.

4. The process according to claim 1, wherein the reference colour disappears upon at least one of a slight tilting of the hologram surface, a slight vertical displacement in viewing position, or a slight change in angle of illuminating radiation.

5. A process for confirming the authenticity of a hologram comprising, providing a hologram comprising a known predetermined colour or image and a reference colour produced by overlapping a first and second zone of spectral dispersion wherein the predetermined colour or image is visible when the reference colour is visible;

viewing the hologram from a position in which the reference colour is visible; and verifying that at the position at which the reference colour is visible, a colour or image corresponding to the known predetermined colour or image appears.

6. The process according to claim 5, wherein the known predetermined colour is at least part of the known predetermined image.

7. The process according to claim 5, wherein the first and second zones of spectral dispersion overlap at an extreme end just prior to the infra-red of the visible spectrum of the first zone and an extreme end just prior to the ultra-violet of the visible spectrum of the second zone.

8. The process according to claim 5, wherein the first and second zones of spectral dispersion are produced by consecutive exposures by a reference beam in conjunction with an object beam which is displaced by a predetermined amount between the two consecutive exposures.

9. The process according to claim 5, wherein the reference colour disappears upon at least one of a slight tilting of the hologram surface, a slight vertical displacement in viewing position, or a slight change in angle of illuminating radiation.

10. A process for confirming the authenticity of an article comprising, providing an article having affixed thereto a hologram comprising a known predetermined colour or image and a reference colour produced by overlapping a first and second zone of spectral dispersion wherein the predetermined colour or image is visible when the reference colour is visible;

viewing the hologram from a position at which the reference colour is visible; and verifying that at the position in which said reference colour is visible, a colour or image corresponding to the known predetermined colour or image appears.

11. The process according to claim 10, wherein the known predetermined colour is at least part of the known predetermined image.

12. The process according to claim 10, wherein the first and second zones of spectral dispersion overlap at an extreme end just prior to the infra-red of the visible spectrum of the first zone and an extreme end just prior to the ultra-violet of the visible spectrum of the second zone.

13. The process according to claim 10, wherein the first and second zones of spectral dispersion are produced by consecutive exposures by a reference beam in conjunction with an object beam which is displaced by a predetermined amount between the two consecutive exposures.

14. The process according to claim 10, wherein the reference colour disappears upon at least one of a slight tilting of the hologram surface, a slight vertical displacement in viewing position, or a slight change in angle of illuminating radiation.

15. The process according to claim 10 wherein the article is a document.

16. A hologram comprising a predetermined colour or image and a reference colour, wherein the predetermined colour or image is visible when the reference colour is visible, said reference colour being obtained by overlapping a first and a second zone of spectral dispersion.

17. The hologram of claim 16, wherein the predetermined colour is at least part of the predetermined image.

18. The hologram of claim 16, wherein the first and second zones of spectral dispersion overlap at an extreme end just prior to the infra-red of the visible spectrum of the first zone and an extreme end just prior to the ultra-violet of the visible spectrum of the second zone.

19. The hologram of claim 16 wherein the first and second zones of spectral dispersion are produced by consecutive exposures by a reference beam in conjunction with an object beam which is displaced by a predetermined amount between the two consecutive exposures.

20. The hologram of claim 16, wherein the reference colour disappears upon at least one of a slight tilting of the hologram, a slight vertical displacement in viewing position, or a slight change in angle of illuminating radiation.

21. An article comprising the hologram of claim 16.

22. A document comprising the hologram of claim 16.

23. A process for identifying a playback position of a hologram, comprising providing a hologram comprising a predetermined image and a reference colour produced by overlapping a first and second zone of spectral dispersion wherein the predetermined image is visible when the reference colour is visible; and viewing the hologram from a position at which the reference colour is visible.

24. The process according to claim 23, wherein the first and second zones of spectral dispersion overlap at an extreme end just prior to the infra-red of the visible spectrum of the first zone and an extreme end just prior to the ultra-violet of the visible spectrum of the second zone.

25. The process according to claim 23 wherein the first and second zones of spectral dispersion are produced by consecutive exposures by a reference beam in conjunction with an object beam which is displaced by a predetermined amount between the two consecutive exposures.

26. A diffracting composition comprising a predetermined colour or image and a reference colour, wherein the predetermined colour or image is visible when the reference colour is visible, said reference colour being obtained by overlapping a first and a second zone of spectral dispersion.

27. The diffracting composition of claim 26, wherein the predetermined colour is at least part of the predetermined image.

28. The diffracting composition of claim 26, wherein the first and second zones of spectral dispersion overlap at an extreme end just prior to the infra-red of the visible spectrum of the first zone and an extreme end just prior to the ultra-violet of the visible spectrum of the second zone.

29. The diffracting composition of claim 26 wherein the first and second zones of spectral dispersion are produced by consecutive exposures by a reference beam in conjunction with an object beam which is displaced by a predetermined amount between the two consecutive exposures.

30. The diffracting composition of claim 26, wherein the reference colour disappears upon at least one of a slight tilting of the hologram, a slight vertical displacement in viewing position, or a slight change in angle of illuminating radiation.

31. An article comprising the diffracting composition of claim 26.

32. A document comprising the diffracting composition of claim 26.

* * * * *